United States Patent
Kaiser et al.

(10) Patent No.: US 12,077,172 B2
(45) Date of Patent: Sep. 3, 2024

(54) AUTOMATICALLY CONTROLLING A DRIVEN AXLE OF A MOTOR VEHICLE

(71) Applicant: GKN Automotive Ltd., Birmingham (GB)

(72) Inventors: Gerd Kaiser, Lobbach (DE); Enrique Cordero, Cologne (DE); Volker-René Ruiters, Siegburg (DE); Marius Offenberg, Langenfeld (DE); Rudolf Fitz, Troisdorf (DE)

(73) Assignee: GKN Automotive Limited, Birmingham (GB)

( * ) Notice: Subject to any disclaimer, the term of this patent is extended or adjusted under 35 U.S.C. 154(b) by 170 days.

(21) Appl. No.: 17/783,067

(22) PCT Filed: Dec. 11, 2019

(86) PCT No.: PCT/EP2019/084569
§ 371 (c)(1),
(2) Date: Jun. 7, 2022

(87) PCT Pub. No.: WO2021/115580
PCT Pub. Date: Jun. 17, 2021

(65) Prior Publication Data
US 2023/0021794 A1     Jan. 26, 2023

(51) Int. Cl.
*B60W 50/12*     (2012.01)
*B60W 10/04*     (2006.01)
(Continued)

(52) U.S. Cl.
CPC .......... *B60W 50/12* (2013.01); *B60W 10/04* (2013.01); *B60W 10/08* (2013.01);
(Continued)

(58) Field of Classification Search
CPC ...... B60W 50/12; B60W 10/04; B60W 10/08; B60W 40/105; B60W 30/18145;
(Continued)

(56) References Cited

U.S. PATENT DOCUMENTS

| | | | |
|---|---|---|---|
| 11,230,196 B2 * | 1/2022 | Wright | ................... B60L 3/102 |
| 2009/0112436 A1 * | 4/2009 | De Carteret | .......... B60T 8/1764 701/83 |

(Continued)

FOREIGN PATENT DOCUMENTS

| | | |
|---|---|---|
| DE | 19639621 A1 | 4/1997 |
| DE | 102019000846 A1 | 8/2019 |

(Continued)

OTHER PUBLICATIONS

JPO Notice of Reasons of Refusal mailed Oct. 3, 2020 for related application JP2022-535815 (22 pages; with English machine translation).

(Continued)

*Primary Examiner* — Sze-Hon Kong
(74) *Attorney, Agent, or Firm* — Bejin Bieneman PLC (57) ABSTRACT

Controlling an actual slip of at least one driven axle of a motor vehicle with at least one axle having at least one wheel and a one drive unit for providing a drive torque for the axle and for the wheel can be carried out by a control device for controlling the drive unit. The control device can be configured for establishing a first actual speed of the motor vehicle; establishing a second actual speed of the at least one wheel; calculating a target speed of the at least one wheel for the established first actual speed taking into account parameters; determining an actual slip of the at least one wheel with respect to a substrate on which the motor vehicle is being moved; when the actual slip exceeds a (Continued)

defined first limit slip, generating a limit torque by which the drive torque produced by the drive unit is adjusted.

14 Claims, 3 Drawing Sheets

(51) Int. Cl.
  *B60W 10/08* (2006.01)
  *B60W 40/105* (2012.01)
  *B60W 30/18* (2012.01)

(52) U.S. Cl.
  CPC ..... *B60W 40/105* (2013.01); *B60W 30/18145* (2013.01); *B60W 2510/0661* (2013.01); *B60W 2510/20* (2013.01); *B60W 2520/28* (2013.01)

(58) Field of Classification Search
  CPC ..... B60W 2510/0661; B60W 2510/20; B60W 2520/28; B60W 2520/10; B60W 2520/105; B60W 2520/26; B60W 2520/266; B60W 2530/201; B60W 2540/18; B60W 2710/0666; B60W 2710/0672; B60W 2710/083; B60W 2710/085; B60W 2720/28; B60W 2720/30; B60W 30/18172; B60K 28/16
  See application file for complete search history.

(56) References Cited

U.S. PATENT DOCUMENTS

| | | | |
|---|---|---|---|
| 2013/0144476 A1* | 6/2013 | Pinto | B60T 8/17555 |
| | | | 903/930 |
| 2020/0247244 A1* | 8/2020 | Yamane | B60L 3/102 |
| 2020/0377149 A1* | 12/2020 | Tagami | B60G 17/0162 |
| 2021/0031750 A1* | 2/2021 | Oh | B60W 40/10 |
| 2021/0078581 A1* | 3/2021 | Velazquez Alcantar | |
| | | | B60L 3/10 |
| 2021/0099118 A1* | 4/2021 | Athavale | H02P 21/09 |

FOREIGN PATENT DOCUMENTS

| | | |
|---|---|---|
| EP | 1690729 A1 | 8/2006 |
| EP | 3372443 A1 | 9/2018 |
| JP | S62-221922 A | 9/1987 |
| JP | H06-66173 A | 3/1994 |
| JP | H09-86381 A | 3/1997 |
| JP | H10-68740 A | 3/1998 |
| JP | 2000204992 A | 7/2000 |
| JP | 2004096822 A | 3/2004 |
| JP | 2006141104 A | 6/2006 |
| JP | 2011-162144 A | 8/2011 |
| JP | 2013042599 A | 2/2013 |

OTHER PUBLICATIONS

International Search Report and Written Opinion for PCT/EP2019/084569 mailed Sep. 10, 2020 (14 pages; with English translation).

* cited by examiner

Fig. 5

AUTOMATICALLY CONTROLLING A DRIVEN AXLE OF A MOTOR VEHICLE

CROSS-REFERENCE TO RELATED APPLICATIONS

This application is a national stage of, and claims priority to, Patent Cooperation Treaty Application No. PCT/EP2019/084569, filed on Dec. 11, 2019, which application is hereby incorporated herein by reference in its entirety.

BACKGROUND

The wheels of a driven axle of a vehicle should ideally have no (or only very little) slip with respect to a substrate so that a ground adhesion or substrate adhesion is achieved at any time to the greatest possible extent. In this case, from a technical viewpoint, even during normal travel (including braking, acceleration, etc.), there is a degree of slip which is brought about by the deformation of the tires. However, this is not considered here. At specific operation points of a motor vehicle and/or a drive unit, however, it may be permissible and particularly even desirable for a wheel or the wheels of the axle to slip in a controlled manner (that is to say, not caused exclusively by deformation of the tires but instead by spinning the tire or the wheel with respect to the substrate) so that a controllable drifting of the motor vehicle can be produced.

Particularly with electric drive units, which can provide a drive torque with a high change rate for driving the axle or for driving the at least one wheel, a monitoring of the slip is advantageous.

SUMMARY

The present disclosure relates to controlling at least one driven axle of a motor vehicle. There is arranged on the axle at least one wheel which is in contact with a substrate and with respect to which the motor vehicle can be moved or is moved. A method for controlling at least one driven axle of a motor vehicle, by which a slip of the wheel or the wheels can be controlled and regulated, is disclosed.

A motor vehicle herein has at least one axle having at least one wheel and at least one drive unit for providing a drive torque for the at least one axle and for the at least one wheel and a control device for controlling the drive unit. A method is carried out during operation of the motor vehicle and comprises at least the following steps:
 a) establishing a first actual speed of the motor vehicle;
 b) establishing a second actual speed of the at least one wheel;
 c) calculating a target speed of the at least one wheel for the established first actual speed taking into account parameters;
 d) determining an actual slip of the at least one wheel with respect to a substrate on which the motor vehicle is being moved;
wherein, when the actual slip exceeds a defined first limit slip, according to step
 e) the control device generates a limit torque, by means of which a drive torque produced by the drive unit is adjusted, for example, limited.

The above (not exhaustive) division of the method steps into a) to e) should primarily serve only for differentiation and not to enforce any sequence and/or dependency. The frequency of the method steps, for example, whilst the method is carried out, may also vary. It is also possible for method steps to at least partially temporally overlap each other. In particular, at least the steps a) to d) are carried out continuously and temporally in parallel with each other, wherein steps c) and d) are carried out on the basis of the characteristic values established in each case in steps a) and b). In a preferred manner, the method steps a) to d) take place continuously. Step e) is in particular conditional and is carried out where applicable only when the actual slip determined according to step d) exceeds a defined first limit slip. In particular, at least the steps a) to d), where applicable the steps a) to e), are carried out in the sequence set out.

The motor vehicle may have one or more axles. The method can be carried out for one, more, or all driven axles.

The at least one axle may comprise a wheel or a plurality of wheels. The wheels of an axle are arranged at different ends of the axle. A drive torque of the drive unit is transmitted via the axle to the at least one wheel. The method controls the drive torque transmitted from the drive unit to the at least one wheel. As a result of the method, the drive unit is directly controlled, that is to say, as a result of the method the drive unit and the drive torque produced thereby is controlled. In this case, when the method is carried out, a drive torque produced by the drive unit should not exceed a limit torque which is generated by the control device.

The first actual speed of the motor vehicle is the current speed of the motor vehicle with respect to the substrate on which the motor vehicle is located or which the at least one wheel contacts.

The second actual speed of the at least one wheel is the current speed of the wheel or correlates thereto.

The (first and/or second) actual speed can be established in known manner, for example, using speed sensors.

From the first actual speed the target speed of the at least one wheel can be determined. The target speed of the at least one wheel is the speed of the wheel which has to be assumed taking into account the first actual speed or correlates thereto.

The target speed corresponds in particular to the second actual speed of the wheel if no slip were present between the wheel and the substrate.

Particularly with axles having a plurality of wheels, parameters have to be taken into account in the determination of the target speed, for example, the geometry of the motor vehicle (that is to say, for example, the spacing of the wheels from a longitudinal axis of the motor vehicle, a steering angle of the wheels with respect to a straight-ahead position, etc.). The parameters should in particular ensure that an actual slip which is intended to be established can be determined with a high level of precision. Factors which would lead to a deviation, for example, between a first actual speed and a second actual speed even when no slip is present should consequently be identified and taken into account and where applicable compensated for. Such a factor could, for example, with a four-wheel, dual-axle motor vehicle, be travel on a bend since the wheel on the outer side of the bend would thereby have travelled a longer path.

From the deviation of the target speed with respect to the second actual speed, an actual slip of the at least one wheel can be determined or calculated. The actual slip refers to the spinning of the wheel with respect to the substrate which the wheel contacts. The actual slip is the difference between the second actual speed and the target speed of the wheel, that is to say, a speed or a velocity which correlates thereto.

The defined first limit slip is a value for a slip of the wheel which is only just considered to be permissible. When the first limit slip is exceeded, step e) of the method is initiated and the drive unit is controlled with respect to the drive torque provided thereby. The first limit slip can be defined in accordance with operating points of the drive unit or operating points of the motor vehicle. The first limit slip may have specific values for specific first actual speeds of the motor vehicle. The first limit slip may be defined in accordance with driving states (travel on bends, start-up, acceleration, braking, drifting, etc.), friction values between the wheel and substrate and/or drive modes which can be selected by the driver (all-terrain, road, eco, comfort, sport, etc.).

The first limit slip is greater than a small first slip which is still considered to be permissible. The first limit slip is smaller than a large second slip which should not be exceeded at any time to the greatest possible extent.

Step e) is carried out only when it is expected that the large second slip may be exceeded. Should it not be expected that it will be exceeded, the drive torque of the drive unit must not be controlled or regulated and limited or where applicable only in the context of a "smooth" control.

As a result of step e), it is possible for the second large slip not to be exceeded at any time. As a result of step e) being carried out, the drive unit is controlled in such a manner that a drive torque requested by a user (for example, driver, cruise control, device for autonomous driving) of the motor vehicle is not provided. The drive unit should as a result of step e) be controlled in such a manner that, on the one hand, the request of the user is taken into account that the drive torque is thus controlled in the direction toward the target drive torque, wherein, on the other hand, however, a slip only below the large second slip is permitted.

The method should in particular enable a drive unit which drives the at least one axle or the at least one wheel to be controlled in such a manner that the at least one wheel spins very little (or in a controlled manner) with respect to the substrate. To this end, the first actual speed of the motor vehicle is determined and the first limit slip is defined taking into account this actual speed.

The second actual speed and a first acceleration of the at least one wheel can further be established.

In particular, for example, on tight bends which are travelled quickly and with an axle load distribution on the axle, only the wheel of the considered axle which is on the outer side of the bend can be taken into account in order to determine the second actual speed. The target speed of the wheel can be calculated with reference to the parameters, that is to say, for example, the geometry of the motor vehicle and the steering wheel angle.

During the determination and/or calculation of the first actual speed, the second actual speed, the target speed, the first acceleration, a second acceleration of the motor vehicle, etc., an appropriate filtering of the variables mentioned can be used.

As soon as the at least one wheel and/or the axle spins or a specific slip is reached (actual slip is greater than the first limit slip), the control device becomes active and generates a limit torque.

In this case, there is first generated by the control device a limit torque which was defined taking into account the first acceleration and the current drive torque.

This limit torque which is first determined may be increased or decreased in particular within the scope of defined change rates, wherein the operating state of the wheel or the axle is taken into account.

This state is defined by the first acceleration and the actual slip of the wheel or the axle.

As soon as the drive torque requested by a user of the motor vehicle falls below the limit torque, the implementation of step e) can be ended again.

The change rates for changing the limit torque should be defined taking into account the present drive train and should be selected in such a manner that they enable the best possible comfort for the user of the motor vehicle with at the same time sufficient limitation of the slip. The slip should thus be returned as quickly as possible within the permissible limits or kept there (that is to say, be smaller than the large second slip). On the other hand, abrupt changes of the torque should be eliminated to the greatest possible extent.

The method may in particular be carried out both for an acceleration with a positive sign (that is to say, toward higher speeds) and with a negative sign (that is to say, toward lower speeds, for example, in the event of recuperation—also known as regenerative braking).

Also in the event of a recuperation, such a high negative torque can act on the axle or the at least one wheel that a slip is produced. The at least one wheel may in this case be braked so powerfully that the adhesion to the substrate is lost. The disclosed method can also be used in this case.

The first limit slip is determined in accordance with the first actual speed. The first limit slip thus has in particular different values for different first actual speeds. The value for the first limit slip is higher with higher first actual speeds than with low first actual speeds.

When a value falls below a defined second limit slip, the generation of a limit torque according to step e) is ended. The torque requested by the user of the motor vehicle can then be produced by the drive unit and transmitted to the at least one wheel or the at least one axle.

The second limit slip may be of the same size as the first limit slip. The second limit slip is smaller than the first limit slip. The second limit slip may also be zero (with the exception of the slip mentioned in the introduction which is caused by the deformation of the tires), that is to say, a slip of the wheel with respect to the substrate is not then present.

A first acceleration of the at least one wheel is established, wherein the limit torque is changed at a change rate taking into account the first acceleration and the drive torque.

The first acceleration may, for example, be calculated by the control unit from characteristic values of the drive unit or established from sensor signals or derived. A conclusion can be drawn from the change of a speed of the axle or the wheel relating to the first acceleration.

The change rate refers in particular to the speed at which a value for the limit torque is changed. The change rate may, for example, be expressed in Newton-meters per second.

The change rate is determined in accordance with the actual slip and a sign of the first acceleration (that is to say, braking or acceleration of the wheel).

The change rate is different in accordance with these characteristic values (actual slip, sign of the first acceleration).

The change rate has larger values for a high actual slip and lower values for a lower actual slip. The change rate may have the same values (but different signs) with respect to the sign of the first acceleration for the respective actual slip.

The change rate may have constant values for specific ranges of values of the actual slip. The change rate may therefore be variable in stages.

As a result of different change rates, it is possible for the slip, on the one hand, to be able to be returned as quickly as possible within the permissible limits or to be kept there. On the other hand, abrupt changes of the torque (that is to say, with lower values of the slip) can substantially be eliminated.

The drive unit comprises at least one electric machine. The method described is particularly suitable for such drive units. With electric machines, the drive torque produced can be changed very quickly so that a slip can be readily produced in the complete speed range. The present method should particularly be used in drive trains in which electric machines are used to provide a drive torque.

The drive unit is connected directly to the axle. A coupling which controls a slip (at the necessary speed) may not be arranged between the drive unit and the axle. However, the arrangement of such a coupling at this location is possible. Typically, no such coupling is also arranged on the axle, that is to say, between the drive unit and the at least one wheel. However, the arrangement of such a coupling at this location is also possible.

The drive unit is connected to the axle by means of a gear mechanism. In particular, a coupling is arranged between the gear mechanism and the drive unit. In particular, this coupling is also not suitable for controlling the slip of the axle or the at least one wheel at the required speed.

The axle has at least two wheels, wherein, when a motor vehicle travels on a bend and in the event of a positive second acceleration of the motor vehicle, the actual speed of the wheel at the outer side of the bend is established as the second actual speed. During a recuperation operation or a possible understeering intervention, the other wheel should be taken into account.

An adhesion or a controlled slip of the wheel of the driven axle at the outer side of the bend is required for stable operation and for controllable travel of the motor vehicle and is therefore taken into account in this case. However, a slip of the wheel at the inner side of the bend may also be undesirable and therefore taken into account.

The axle has at least two wheels, wherein, when the motor vehicle travels on a bend and in the case of a negative second acceleration (for example, recuperation) of the motor vehicle, at least the actual speed of the wheel at the inner side of the bend is established as the second actual speed.

For the establishment of the second actual speed, a plurality of wheels are taken into account so that an actual slip can be monitored on a plurality or even on all wheels of the driven axle(s).

In particular, at least one geometry of the motor vehicle and a steering angle of the wheels are taken into account as parameters. Reference may be made to the above statements.

There is further disclosed a motor vehicle at least comprising
  an axle having at least one wheel and
  a drive unit for providing a drive torque for the axle and for the at least one wheel, and
  a control device for controlling the drive unit.

The control device is constructed or configured in an appropriate manner to carry out the method.

There is further disclosed a control device which is equipped, configured or programmed to carry out the method described.

The method can also further be carried out by a computer or with a processor of a control unit.

Accordingly, there is also disclosed a system for data-processing which comprises a processor which is adapted/configured in such a manner that it carries out the method or a portion of the steps of the disclosed method.

There may be provided a computer-readable storage medium which comprises commands which, when carried out by a computer/processor, cause it to carry out the method or at least some of the steps of the disclosed method.

The statements relating to the method can applied to the motor vehicle or the computer-implemented method (that is to say, the computer or the processor, the system for data-processing, the computer-readable storage medium), and vice versa.

The use of indefinite articles ("a", "an", "of a" and "of an") in particular in the claims and the description which repeats them is intended to be understood as such and not as a numeral. Terms or components which are thereby introduced accordingly are consequently intended to be understood to be present at least once but may also particularly be present several times.

It should be noted that the numerals used here ("first", "second", etc.) serve primarily (only) to distinguish a plurality of similar objects, variables or processes, that is to say, do not necessarily determine any dependency and/or sequence of these objects, variables or processes with respect to each other. Should a dependency and/or sequence be required, this is explicitly set out here or it is self-evident for the person skilled in the art upon studying the configuration which has been specifically described. In so far as a component may occur several times ("at least one"), the description relating to one of these components may apply equally to all or some of the plurality of these components, but this is not necessarily the case.

BRIEF SUMMARY OF THE DRAWINGS

The disclosure is explained in greater detail below with reference to the appended Figures. It should be noted that the invention is not intended to be limited by the embodiments set out. In particular, unless explicitly stated otherwise, it is also possible to extract partial aspects of the facts explained in the Figures and to combine them with other components and knowledge from the present description. In particular, it should be noted that the Figures and the illustrated value relationships are merely schematic. In the drawings.

DESCRIPTION

Figure 1:
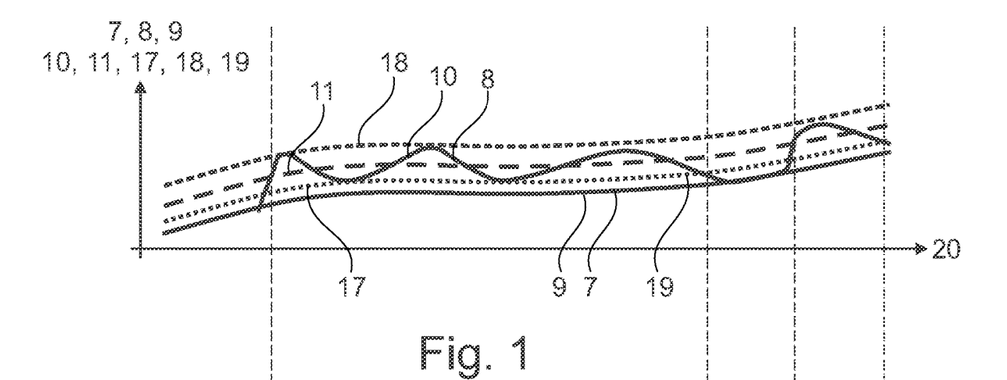
FIG. 1: shows a first graph in which paths of speed and slip over time are depicted.
Figure 2:
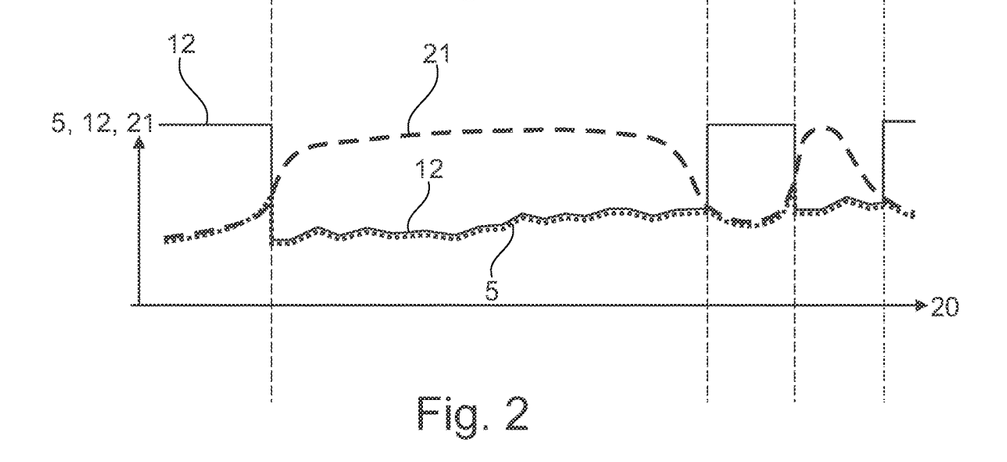
FIG. 2: shows a second graph in which paths of torques over time are depicted.

FIG. 1 shows a first graph, in which paths of speed 7, 8, 9 and slip 10, 11, 17, 18, 19 over time 20 are depicted. FIG. 2 shows a second graph in which paths of torques 5, 12, 21 over time 20 are depicted. FIGS. 1 and 2 are described together below.

In the first graph, the speeds 7, 8, 9 and the respective slips 10, 11, 17, 18, 19 are indicated on the vertical axis. The time 20 is depicted on the horizontal axis.

In the second graph, the torques 5, 12, 21 are indicated on the vertical axis. The time 20 is indicated on the horizontal axis.

The first graph and the second graph correlate to each other, that is to say, the respective paths are dependent on each other and are indicated over the same timescale.

According to FIG. 1, it can be seen that the motor vehicle 2 is operational and has a first actual speed 7 with respect to the substrate. The target speed 9 of the wheel 3 or the axle 1 corresponds to the first actual speed 7. For the target speed 9, it is assumed that there is no slip in this case (with the exception of the slip which is mentioned in the introduction and which is caused by the deformation of the tires). Furthermore, a path of the second actual speed 8 of the axle 1 is illustrated. It can be seen that the path of the second actual speed 8 clearly differs from the target speed 7. In most of the operating states illustrated here, there is thus an actual slip 10 which is also illustrated by the path of the second actual speed 8. Furthermore, a small first slip 17, a high second slip 18 and a first limit slip 11 and a second limit slip 19 are illustrated. The second limit slip 19 corresponds to the first slip 17. The method disclosed particularly seeks during normal operation of the motor vehicle to adjust the actual slip 10 to a maximum of the first limit slip 11.

According to FIG. 2, it can be seen that a drive torque 5 which is provided by the drive unit 4 is limited at specific operating points to the limit torque 12 generated by the method. In this case, a drive torque 21 which is requested by a user of the motor vehicle 2 and which is higher than the limit torque 12 is ignored and specifically not produced in the drive unit 4. FIG. 1 shows that the first limit slip 11 was exceeded at these operating points and the excess value has not fallen below the second limit slip 19 again.

At other operating points, a limit torque 12 which could limit the required drive torque 21 has not been generated. In this case, the first limit slip 11 was previously not exceeded or, after it has been exceeded, the excess value has fallen below the second limit slip 19 again.

FIG. 2 illustrates the limit torque 12 at operating points at which no limit torque 12 has been generated as a result of the method at a constant high value, that is to say, at these operating points, the limit torque is always higher than a drive torque 5 which can be provided by the drive unit 4.

The method prevents or attempts to prevent a high second slip 18 from being reached or exceeded. To this end, there is generated a limit torque 12 which at specific operating points may be provided as a maximum by the drive unit 4. Should a high second slip 18 nonetheless be exceeded, however, the torque provided by the drive unit 4 can be reduced in a more restrictive manner.

Figure 3:
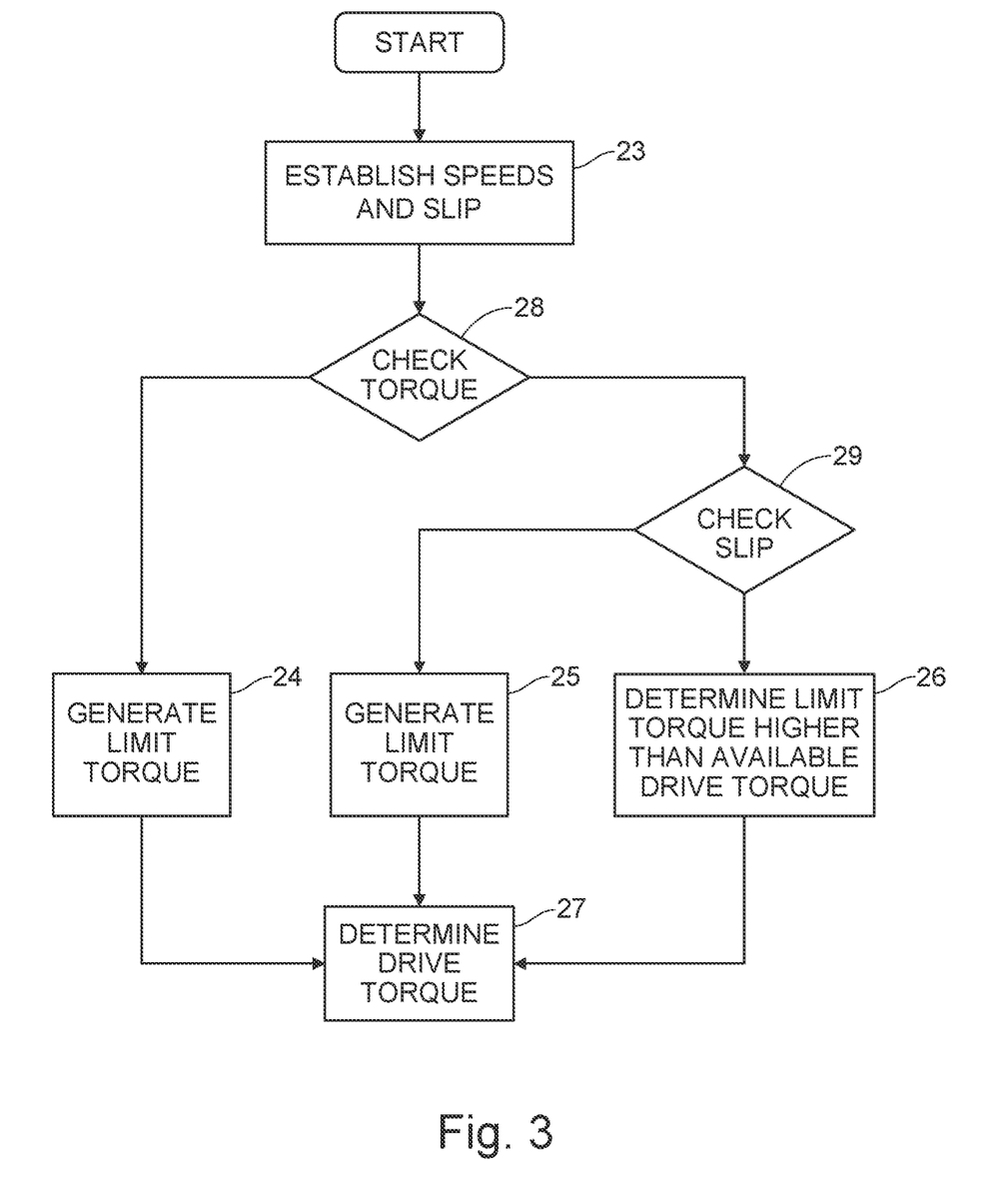
FIG. 3: shows a flow chart for the method.

FIG. 3 illustrates a flow chart for the method. Reference may be made to the statements relating to FIGS. 1 and 2.

The method is carried out during operation of the motor vehicle 2. After the start 22 of the method (for example, after starting operation of the motor vehicle 2), a first actual speed 7 of the motor vehicle 2 is established in the first field 23 according to step a). According to step b), a second actual speed 8 of the at least one wheel 3 or the axle 1 is established in the first field 23. According to step c), a target speed 9 of the at least one wheel 3 for the established first actual speed 7 is calculated in the first field 23 taking into account parameters.

According to step d), an actual slip 10 of the at least one wheel 3 with respect to a substrate on which the motor vehicle 2 is being moved is also determined in the first field 23.

After the first field 23, in the context of the method in a first decision 28, it is checked whether a limit torque 12 has been generated and is already present and whether this limit torque 12 is smaller than a drive torque 21 requested by a user.

If a limit torque 12 is present and in this case is smaller than a drive torque 21 requested by a user, according to the second field 24 a limit torque 12 is defined and generated in accordance with the first acceleration 13 and the actual slip 10 of the wheel 3 or the axle 1 and the current drive torque 5.

If there is not yet any limit torque 12 or the limit torque 12 which is present has not been exceeded, in the context of a second decision 29, it is checked whether an actual slip 10 which is higher than the first limit slip 11 is present. If this is the case, a limit torque 12 is generated in the third field 25. If this is not the case, the limit torque 12 is determined in the fourth field 26 at a value which is higher than a drive torque 5 which can be provided by the drive unit 4.

The drive torque 5 of the drive unit 4 which can be produced and transmitted to the axle 1 or the at least one wheel 3 is determined in the fifth field 27. It is either a drive torque 5 which is limited by the limit torque 12 or an unlimited drive torque 5 which then corresponds to the drive torque 21 requested by the user.

In the second field 24 and the third field 25, the limit torque 12 which was initially determined can be increased or decreased within the scope of defined change rates, wherein the operating state of the wheel 3 or the axle 1 is taken into account. This operating state is defined by the first acceleration 13 and the actual slip 10 of the wheel 3 or the axle 1.

Step e) is carried out only when it is expected that the large second slip 18 may be exceeded or when the first limit slip 11 is exceeded (second decision 29 and toward the third field 25). Should it not be expected that the value may be exceeded, the drive torque 5 of the drive unit 4 does not have to be controlled or regulated and limited. In this case, the method goes from the second decision 29 to the fourth field 26. In the fourth field 26, it is determined that the limit torque 12 has been fixed at a value which is higher than a drive torque 5 which can be provided by the drive unit 4.

Figure 4:
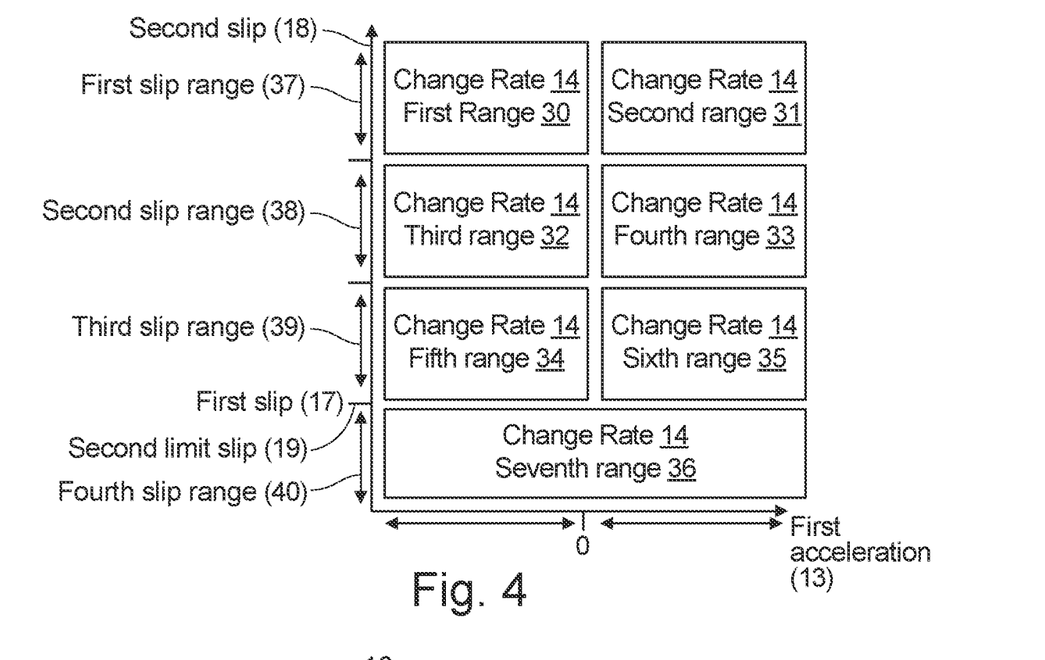
FIG. 4: shows a graph which illustrates different change rates in accordance with slip and acceleration.

FIG. 4 shows a graph which illustrates different change rates 14 in accordance with slip 11, 17, 18, 19 and a first acceleration 13 of the wheel 3. Reference may be made to the statements relating to FIGS. 1 to 3.

The slip 11, 17, 18, 19 is indicated on the vertical axis. The first acceleration 13 is indicated on the horizontal axis. In this case, negative values of the first acceleration 13 are located to the left of zero and positive values of the first acceleration 13 are located to the right of the zero.

The limit torque 12 generated when a specific actual slip 10 is present can be increased or decreased within the scope of defined change rates 14, wherein the operating state of the wheel 3 or the axle 1 is taken into account.

A first acceleration 13 of the at least one wheel 3 is established, wherein the limit torque 12 is changed with a specific change rate 14 taking into account the first acceleration 13 and the drive torque 5.

This operating state is defined by the first acceleration 13 and the actual slip 10 of the wheel 3 or the axle 1.

The change rates 14 for changing the limit torque 12 are selected in such a manner that they enable the best possible comfort for the user of the motor vehicle 2 with at the same time sufficient limitation of the actual slip 10. The actual slip 10 should thus be returned as quickly as possible within the permissible limits or kept there (that is to say, be smaller than the large second slip 18). On the other hand, abrupt changes of the drive torque 5 should be eliminated to the greatest possible extent.

The method can be carried out both for a first acceleration 13 with a positive sign (that is to say, in a direction toward higher speeds) and with a negative sign (that is to say, in a direction toward lower speeds, for example, in the event of recuperation).

Also in the event of a recuperation operation, such a high negative torque may act on the axle 1 or the at least one wheel 3 that an actual slip 10 is produced. The at least one wheel 3 may in this case be so powerfully braked that the adhesion to the substrate is lost. The method disclosed can also be used in this case.

The change rate 14 refers to the speed at which a value for the limit torque 12 is changed. The change rate 14 may, for example, be expressed in Newton-meters per second.

The change rate 14 is determined in accordance with the actual slip 10 and a sign of the first acceleration 13 (that is to say, braking or acceleration of the wheel 3).

FIG. 4 shows that the change rate 14 is different depending on these characteristic values (actual slip 10, sign of the first acceleration 13). To this end, different ranges 30, 31, 32, 33, 34, 35, 36 are provided, wherein an individual constant value for the change rate 14 is present in each of the ranges in each case.

The change rate 14 has higher values for a high actual slip 10 (for example, first range 30 and second range 31 in the first slip range 37) and lower values for a lower actual slip 10 (for example, fifth range 34 and sixth range 35 in the third slip range 39). The change rate 14 has the same values with a very low actual slip 10 for both signs of the first acceleration 13 (seventh range 36 in the fourth slip range 40). The third range 32 and the fourth range 33 are arranged between the ranges 30, 31 and the ranges 34, 35 (with a mean actual slip 10, that is to say, at the second slip range 38).

The change rate 14 thus has constant values in the specific ranges 30, 31, 32, 33, 34, 35, 36. The change rate 14 can thus be changed in stages.

Figure 5:
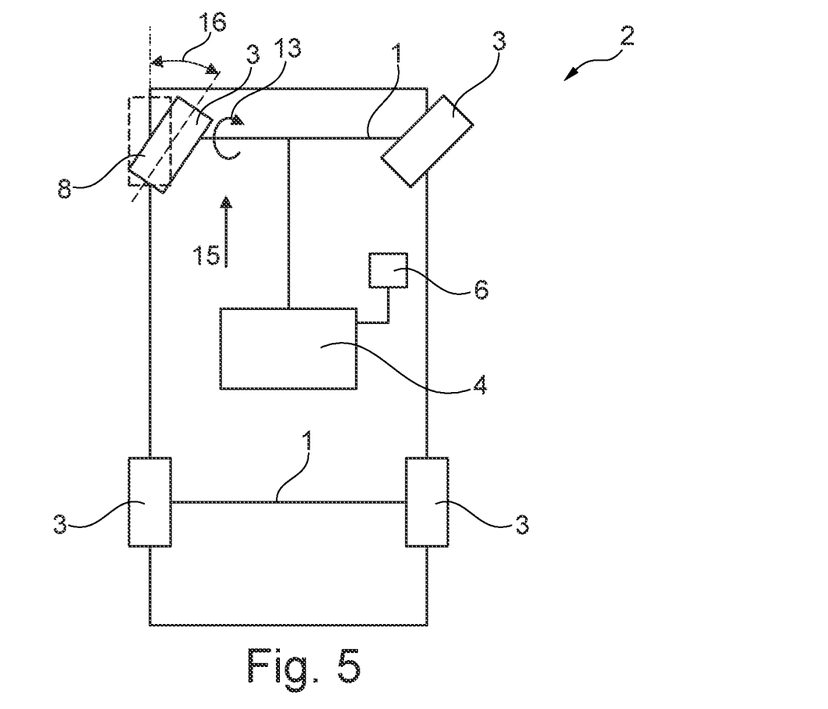
FIG. 5: shows a motor vehicle.

FIG. 5 shows a motor vehicle 2. The motor vehicle 2 comprises a driven axle 1 having two wheels 3, a non-driven axle 1 having two wheels 3 and a drive unit 4 for providing a drive torque 5 for the driven axle 1 and for the wheels 3. Furthermore, the motor vehicle 2 comprises a control device 6 for controlling the drive unit 4. The control device 6 is configured in an appropriate manner to carry out the method.

The drive unit 4 is connected directly to the axle 1. The axle 1 has two wheels 3, wherein, when the motor vehicle 3 travels on a bend and with a positive second acceleration 15 of the motor vehicle 2, the actual speed of the wheel 3 at the outer side of the bend is established as the second actual speed 8.

A geometry of the motor vehicle 2 (in this case, for example, the spacing of the wheels 3 of an axle 1 with respect to each other) and a steering angle 16 of the wheels 3 are taken into account as parameters.

LIST OF REFERENCE NUMERALS

1 Axle
2 Motor vehicle
3 Wheel
4 Drive unit
5 Drive torque
6 Control device
7 First actual speed
8 Second actual speed
9 Target speed
10 Actual slip
11 First limit slip
12 Limit torque
13 First acceleration
14 Change rate
15 Second acceleration
16 Steering angle
17 First slip
18 Second slip
19 Second limit slip
20 Time
21 Required drive torque
22 Start
23 First field
24 Second field
25 Third field
26 Fourth field
27 Fifth field
28 First decision
29 Second decision
30 First range
31 Second range
32 Third range
33 Fourth range
34 Fifth range
35 Sixth range
36 Seventh range
37 First slip range
38 Second slip range
39 Third slip range
40 Fourth slip range

The invention claimed is:

1. A method for controlling at least one driven axle of a motor vehicle, wherein the motor vehicle has at least one axle having at least one wheel and at least one drive unit for providing a drive torque for the at least one axle and for the at least one wheel and a control device for controlling the drive unit; wherein the method is carried out during operation of the motor vehicle and comprises:
   a) establishing a first actual speed of the motor vehicle;
   b) establishing a second actual speed of the at least one wheel;
   c) calculating a target speed of the at least one wheel for the established first actual speed taking into account parameters;
   d) determining an actual slip of the at least one wheel with respect to a substrate on which the motor vehicle is being moved;
   e) when the actual slip exceeds a defined first limit slip, generating a limit torque by which the drive torque produced by the drive unit is adjusted;
   wherein the axle has at least two wheels;
   wherein, when the motor vehicle travels on a bend, in the event of a positive second acceleration of the motor vehicle, the actual speed of the wheel at the outer side of the bend is established as the second actual speed and/or in the event of a negative second acceleration of the motor vehicle, at least the actual speed of the wheel at the inner side of the bend is established as the second actual speed.

2. The method of claim 1, wherein the first limit slip is determined in accordance with the first actual speed.

3. The method of claim 1, wherein, when a value falls below a defined second limit slip, the generation of a limit torque is ended.

4. The method of one claim 1, wherein a first acceleration of the at least one wheel is established; wherein the limit torque is changed at a change rate taking into account the first acceleration and the drive torque.

5. The method of claim 4, wherein the change rate is determined in accordance with the actual slip and a sign of the first acceleration.

6. The method of claim 1, wherein the drive unit comprises at least one electric machine.

7. The method of claim 1, wherein at least one geometry of the motor vehicle and a steering angle of the wheels are taken into account as parameters.

8. A control device for a motor vehicle that includes an axle having at least one wheel and a drive unit for providing a drive torque for the axle and for the at least one wheel, wherein the control device is configured to control the drive unit according to programming for:
- a) establishing a first actual speed of the motor vehicle;
- b) establishing a second actual speed of the at least one wheel;
- c) calculating a target speed of the at least one wheel for the established first actual speed taking into account parameters;
- d) determining an actual slip of the at least one wheel with respect to a substrate on which the motor vehicle is being moved; and
- e) when the actual slip exceeds a defined first limit slip, generating a limit torque by which the drive torque produced by the drive unit is adjusted;
  wherein the axle has at least two wheels;
  wherein, when the motor vehicle travels on a bend, in the event of a positive second acceleration of the motor vehicle, the actual speed of the wheel at the outer side of the bend is established as the second actual speed and/or in the event of a negative second acceleration of the motor vehicle, at least the actual speed of the wheel at the inner side of the bend is established as the second actual speed.

9. The control device of claim 8, further configured to determine the first limit slip in accordance with the first actual speed.

10. The control device of claim 8, further configured such that, when a value falls below a defined second limit slip, the generation of a limit torque is ended.

11. The control device of claim 8, further configured to establish a first acceleration of the at least one wheel; wherein the limit torque is changed at a change rate taking into account the first acceleration and the drive torque.

12. The control device of claim 11, further configured to determine the change rate with the actual slip and a sign of the first acceleration.

13. The control device of claim 8, wherein the drive unit comprises at least one electric machine.

14. The control device of claim 8, further configured to take into account as parameters at least one geometry of the motor vehicle and a steering angle of the wheels.

* * * * *

UNITED STATES PATENT AND TRADEMARK OFFICE
CERTIFICATE OF CORRECTION

| | | |
|---|---|---|
| PATENT NO. | : 12,077,172 B2 | Page 1 of 1 |
| APPLICATION NO. | : 17/783067 | |
| DATED | : September 3, 2024 | |
| INVENTOR(S) | : Gerd Kaiser et al. | |

It is certified that error appears in the above-identified patent and that said Letters Patent is hereby corrected as shown below:

In the Claims

Column 10, in Line 59, replace "method of one claim 1," with -- method of claim 1, --.

Signed and Sealed this
First Day of October, 2024

Katherine Kelly Vidal
*Director of the United States Patent and Trademark Office*